United States Patent

Rinehart et al.

[11] Patent Number: 6,114,036
[45] Date of Patent: *Sep. 5, 2000

[54] FLEXIBLE FIRE RETARDANT MULTI-LAYER STRUCTURES COMPRISING POLYOLEFIN AND POLYAMIDE LAYERS AND PROCESS FOR MAKING THE SAME

[75] Inventors: Robert Eugene Rinehart, Fredon; Peter Julius Kartheiser, Long Valley, both of N.J.

[73] Assignee: AlliedSignal Inc., Morris Township, N.J.

[ * ] Notice: This patent is subject to a terminal disclaimer.

[21] Appl. No.: 07/853,224

[22] Filed: Mar. 17, 1992

[51] Int. Cl.$^7$ .............................. B32B 27/00; D02G 3/00
[52] U.S. Cl. .................. 428/383; 428/476.3; 428/476.9; 428/920; 524/113; 427/393.3; 252/609; 174/107; 8/115.7; 8/584
[58] Field of Search ................................ 428/383, 476.3, 428/476.9, 920; 524/119; 427/393.3; 8/584, 115.7; 252/609; 174/107

[56] References Cited

U.S. PATENT DOCUMENTS

| | | | |
|---|---|---|---|
| 3,789,081 | 1/1974 | Anderson | 558/77 |
| 3,789,091 | 1/1974 | Anderson et al. | 558/77 |
| 3,849,368 | 11/1974 | Anderson et al. | 524/119 |
| 4,327,248 | 4/1982 | Campbell | 174/107 |
| 4,397,759 | 8/1983 | Hancock | 252/609 |
| 4,732,789 | 3/1988 | Hauser | 427/393.3 |
| 4,748,705 | 6/1988 | Johnson et al. | 8/115.7 |
| 4,752,300 | 6/1988 | Johnson | 8/584 |
| 4,868,054 | 9/1989 | Kartheiser | 428/383 |
| 4,877,467 | 10/1989 | Marsden et al. | 156/51 |

FOREIGN PATENT DOCUMENTS

| | | |
|---|---|---|
| 0 151 904 | 8/1985 | European Pat. Off. . |
| WO 92/13717 | 8/1992 | WIPO . |

OTHER PUBLICATIONS

Novel Flame Retarded Moisture Curable Polyolefin Compounds, Keoghital, Mar. 1989, pp. 269–276.
Test for Flammability of Plastics Materials for Parts in Devices and Appliances, Mar. 19, 1990, pp. 5–6B, 8–10A, 12–14A, 16, A1, A3.
Reference Standard for Electrical Wires, Cables, and Flexible cords—UL 1581, Aug. 15, 1983, pp. 95–104A.

*Primary Examiner*—Leszek Kiliman
*Attorney, Agent, or Firm*—Roger H. Criss

[57] ABSTRACT

Multilayer structure having a first layer of a fire retardant polyolefin comprising composition and a second layer of a polyamide comprising composition comprises up to 20% by weight of a phosphonate ester having the structure:

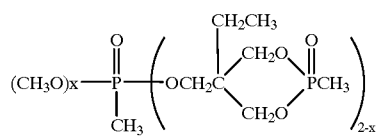

wherein the value of "x" is 0 or 1.

15 Claims, 1 Drawing Sheet

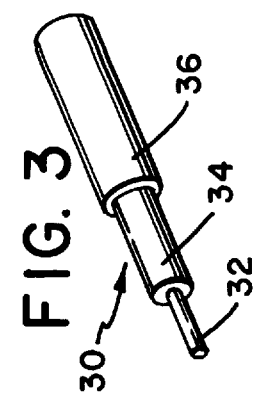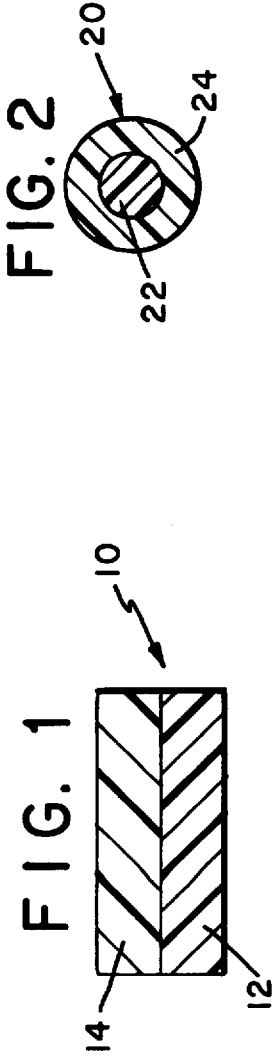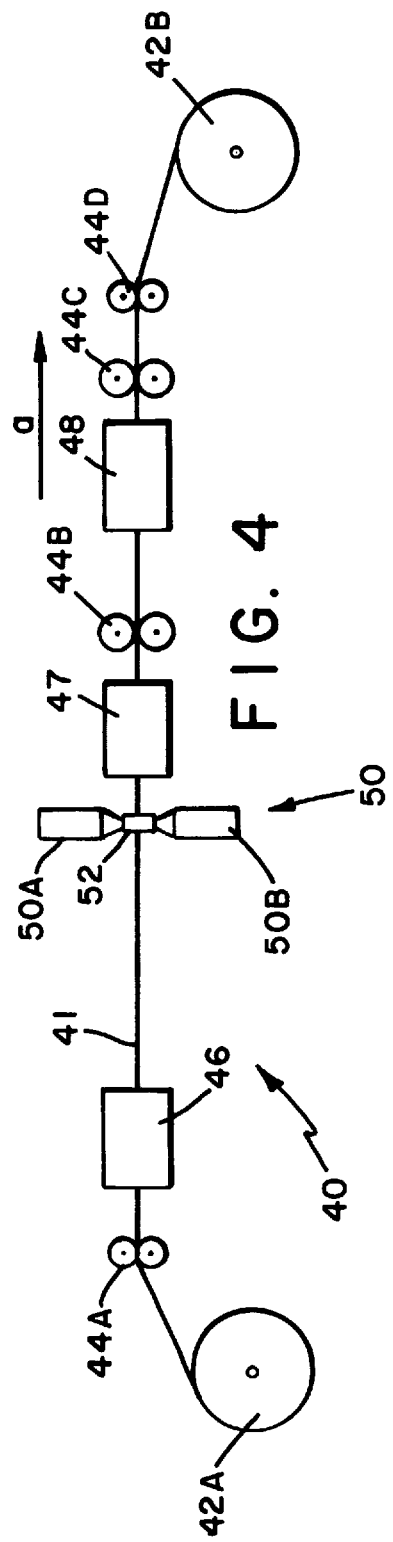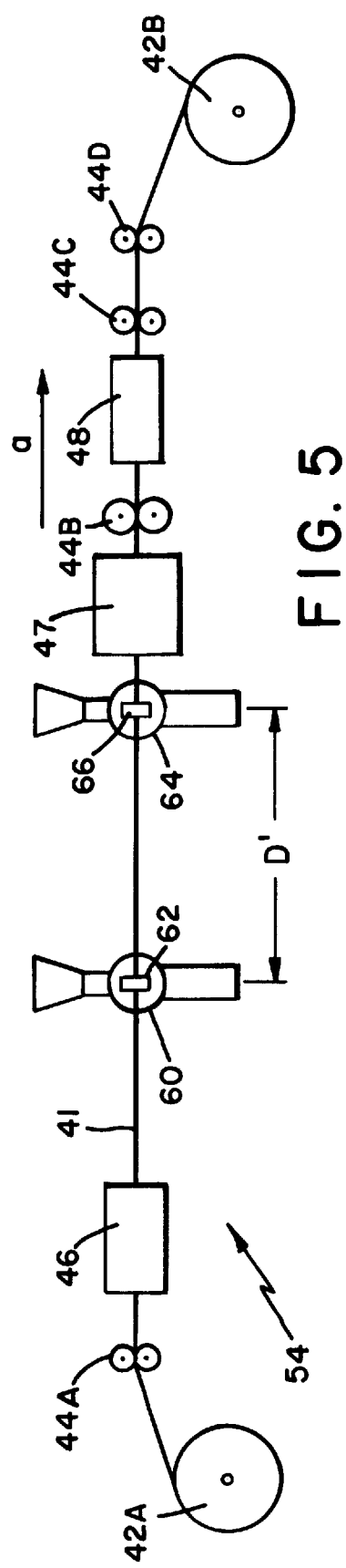

FLEXIBLE FIRE RETARDANT MULTI-LAYER STRUCTURES COMPRISING POLYOLEFIN AND POLYAMIDE LAYERS AND PROCESS FOR MAKING THE SAME

BACKGROUND OF THE INVENTION

1. Field of the Invention

The present invention relates to improved structures and processes for making the same which comprise a first structure which comprises a flame retardant polyolefin, and a second structure which comprises a polyamide which exhibits good fire retardant properties. The improved structures find particular utility as electrical insulating structures for electrical current conductors, namely wires and cables.

2. Description of the Prior Art

Multi-layer structures typically comprise at least two or more layers of materials featuring different physical properties, which properties are optimally optimized in order to satisfy a particular need at hand. The goal of the formation of such structures is to provide a structure which is directed to a particular need, and wherein the individual layers of the structures act to form a composite, and where each layer of material contributes to serve the function for which the structure is designed. Examples of such structures are well known to the art, and include composites which are used to form films, wherein each layer forming the film may feature a particular property, such as impermeability to a gas, or as a blocking layer to light or radio energy of a particular wavelength. Another example of such a structure may be those which would be used to form an insulation structure for an electrical conductor, where each layer forming a jacket about the conductor might feature improved abrasion resistance, or improved dielectric strength, or the like. Other uses of such structures are notorious and known to the art.

The use of such multi-layer structures is widespread with electrical conductors. These conductors typically consist of a wire conductor (which is frequently a metal, including copper) which is surrounded by a multi-layer structure. Examples of such constructions include those taught in U.S. Pat. Nos. 3,576,940; 3,860,686; 4,079,191; 4,292,463; 4,327,248; 4,419,538; 4,472,597; 4,510,348; 4,626,619; and 4,691,082. Therein are disclosed a variety of constructions wherein each of the layers may be a polymer, a metal, an elastomeric material, a fibrous material, etc., where each layer offers a particular advantage, i.e., dielectric strength, water impermeability, etc.

A technical paper titled "Novel Flame Retarded Moisture Curable Polyolefin Compounds" by M. J. Keogh and M. E. Lowell presented on Mar. 12–15, 1989 describes the use of various types of flame retardant polyolefins in wire and cable constructions.

Two favorable materials which may be used in the construction of electrical conductors are polyolefins and polyamides (hereinafter interchangeably referred to as "PA"). These materials are favored as the polyolefin generally forms a good flexible insulator, while PA generally exhibits good abrasion resistance properties.

While multi-layer structures used as electrical conductors are seen to perform well, such structures also suffer from certain undesirable characteristics. One such characteristic is in the fire retardancy of such multi-layer structures. In the case where such are to be used to form electrical insulation layers enrobing an electrical current conductor, such as a wire or plurality of wires, the requirement of good fire retardancy is of paramount importance. As is known, electrical cables present in a commercial, residential or other structure (i.e., office buildings, homes, public buildings, and facilities) comprise a plurality of individual wires which are contained within a jacketing layer, or other plenum. In the event of a fire within such a structure, the hazard of such a fire would be greatly compounded where the insulation layer enrobing an electrical current conducting wire were to burn or melt off, and thereby expose the wire to contact with an alternate current path. Such a current path could be the structure or element of a structure within which the wire is present, or in the more undesirable alternative, with a person's body. Further, melting of an insulating layer of a current conducting wire, particularly where proximately located to other current conducting wires with similarly degraded insulation layers raises the risk of contact between the wires and the formation of a short circuit; such an event raises the risk of ignition of surrounding materials. Alternately, if surrounding materials are not ignited, there remains the risk and consequent hazard of the ignition, burning or melting of the materials used to form insulating layers over the wire. Such materials frequently emit harmful emissions, which in sufficient concentration may prove fatal. Another disadvantage of fumes from insulation containing halogens such as chlorine found in PVC, are the harmful effects on health and on the environment. The harmful effects of even small concentrations of halogen or halogen acids is well documented. Halogen acid fumes are also very corrosive to metal. In areas where there may be articles such as instrumentation and equipment which is sensitive to the corrosive effects of acid containing or halogen containing fumes, there is the further substantial likelihood of the destruction of said articles.

Various structures providing good fire retardant characteristics are known to the art. For example, it is known to include various fire retardant additives to polyamide compositions to increase the fire retardancy thereof; such materials include halogenated organic materials in conjunction with antimony oxides. While such additives provide good fire retardancy to the polyamide, these additives frequently need be present in relatively high concentrations, typically up to 20% of the halogenated organic material, and up to 5% of an antimony oxide. A further additive known to impart good fire retardant behavior to polyamides is red phosphorous which is found to be effective in compositions at concentrations as low as 20% by weight. However, both these additive systems are also known to suffer drawbacks. Both systems are known to decrease the flexural and elongative properties of the polyamide comprising compositions of which they are a constituent. Where a polyamide containing composition having an ultimate elongation of 100% would be considered to be highly desirable, and be particularly useful in forming part of a flexible structure well suited for insulating electrical current conductors, the use of such types of a additives are also known to substantially reduce the ultimate elongation and other flexural characteristics of polyamide compositions of which they comprise a part.

Additionally, red phosphorous is known to impart a deep color to polyamide compositions which is also frequently undesirable.

It should be apparent that there remains a continuing need in the art for multi layer structures featuring good flexural characteristics and good fire retardant properties, as well as methods for making the same. Such multi layer structures would be particularly useful in forming insulation structures for electrical current conductors.

SUMMARY

The present invention provides a multi-layer structure which exhibit good fire retardant behavior, good flexural properties and which finds particular utility as multi-layer structures for electrical current conductors, and in optical waveguides.

The present invention also provides improved methods of producing multi-layer structures which exhibit good fire retardant behavior and good flexural properties.

The multi-layer structures of the instant invention includes a first layer formed from a composition which comprises a flame retarded polyolefin composition and which may optionally include further additives, and a second layer formed from a composition which comprises a polyamide, and up to about 20% by weight of a phosphonate ester, and optionally includes further constituents as additives.

The present invention also provides an improved method of forming a flexible, fire retardant structure having two layers.

In a further aspect of the invention, there is provided an improved method of producing a flexible insulating structure enrobing an electrical current conductor, or an optical waveguide, which flexible insulating structure features good fire retardant properties.

In a still further aspect of the present invention, there is provided an insulated electrical current conductor, wherein the insulating structure of the said conductor comprises two layers of thermoplastic materials which includes a first layer formed from a composition which comprises a flame retarded polyolefin composition and which may optionally include further additives, and a second layer formed from a composition which comprises a polyamide, and up to about 20% by weight of a phosphonate ester, and optionally includes further constituents as additives.

Other advantages and features of the present invention will become apparent from the following description, attached drawings, and appended claims.

BRIEF DESCRIPTION OF THE DRAWINGS

FIG. 1 is an end perspective view of one aspect of the invention, showing a multi-layer structure wherein the polyolefin and PA layers are of a generally planar form.

FIG. 2 is an end perspective view of a further aspect of the instant invention and shows a perspective view of a multi-layer structure in accordance with the present invention.

FIG. 3 is a further embodiment of the present invention, and illustrates an exploded perspective view of an electrical conductor utilizing the multi-layer structure of the present invention.

FIG. 4 is a schematic representation of an industrial process for producing a multi-layer structure of the invention by coextrusion techniques.

FIG. 5 is a further schematic representation of an industrial process for producing a multi-layer structure of the invention by tandem extrusion techniques.

DESCRIPTION OF THE PREFERRED EMBODIMENTS

According to the invention, a multi-layer structure exhibiting good fire retardant behavior and good flexural properties and which finds particular utility as multi-layer structures for electrical applications is provided. The multi-layer structure comprises two layers of thermoplastic materials which includes a first layer formed from a composition which comprises a a fire retarded polyolefin composition which may optionally include further additives, and a second layer formed from a composition which comprises a polyamide, and up to about 20% by weight of a phosphonate ester, and optionally includes further constituents as additives.

As has been noted above, the first layer consists of fire retarded polyolefin composition optionally further comprising conventional constituents which may be desirably included in the first layer.

The polyolefin to be incorporated may be any grade of polyolefin desired which is formable into the structures taught in the instant invention, and as such allows for considerable flexibility in the specification of the polyolefin. The polyolefin described here is to be understood to include polyolefin compositions which comprise at least one polyolefin homopolymer or at least one polyolefin copolymer, or both. Mixtures of various polyolefins are also contemplated as useful. The polyolefin may exhibit any desired physical properties, such as specific molecular weight or weight range, temperature duty rating, colorants, and may further include quantities of additives commonly used in the art, in amounts which are not found to be significantly detrimental to the flexibility or fire retardant behavior of the multi-layer structure. The fire retarded polyolefin composition used to form the first layer further includes effective amount of a fire retarding additive such as those presently known to the art; preferably the fire retarding additive (interchangeably referred to as a "flame retardant") used in conjunction with the polyolefin is a non-halogenated flame retardant.

Preferred polyolefins useful in the formation of the fire retardant polyolefin composition include extrudable fire retardant polyolefin comprising compositions.

One optional additive to the polyolefin comprising composition which forms the above noted first layer of the multi-layer structure includes pigments or other coloring agents which may be blended or otherwise incorporated into the polyolefin layer; such colorants are useful in wire "coding" or other identification and/or marking systems. Other additives may be also included in the composition.

Exemplary fire retardant polyolefin compositions include those described in "Novel Flame Retarded Moisture Curable Polyolefin Compounds" described above. Useful polyolefin compositions and processes for making such useful polyolefin compositions include those described in U.S. Pat. Nos. 4,575,473; 4,579,913; 4,593,071; 4,526,930 and 4,593,072.

The fire retardant polyolefin compositions and any further optional constituents, including but not limited to effective amounts of a fire retarding additive, used to form the composition of the first layer of the multi-layer structure may be combined in any manner capable of thoroughly distributing the materials within one another. Methods which are recognized as suitable for use include physical mixing such as the physical mixing attained via the use of a tumbling vessel, and by melt extrusion. Preferably, the constituents are melt extruded wherein measured amounts of the polyolefin and any further constituents are physically mixed and subsequently introduced to a single screw extruder, twin-screw extruder, or plastificator, heated to a temperature above the softening point of at least one of the constituents and subsequently extruding the constituents through a die to form strands which are then pelletized. The resulting pellets comprising the polyolefin and any optional constituents which are ultimately used to form the first layer may be used as feedstock for the further extrusion operations in accordance with the present invention.

Polyamides suitable for use in conjunction with the instant invention include well-known polyamides which are long chained polymeric structures having recurring amide groups as part of their polymer backbone. Preferably, the polyamides have a relative viscosity of from about 40 to about 250 measured in 90% formic acid at a concentration of 9.2 weight percent.

Non-limiting examples of such polyamides are:

(a) those prepared by the polymerization of lactams, and preferably epsilon-caprolactam (nylon 6);

(b) those prepared by the condensation of a diamine with a dibasic acid, and preferably the condensation of hexamethylene diamine with adipic acid (nylon 6,6); the condensation of hexamethylene diamine with sebacic acid (nylon 6,10), the condensation of tetramethylenediamine with adipic acid (nylon 4,6), and the condensation of hexamethylene diamine with azelaic acid (nylon 6,9);

(c) those prepared by self-condensation of amino acids, and preferably self-condensation of 11-aminoundecanoic acid (nylon 11) and self-condensation of 12-aminododecanoic acid (nylon 12); and (d) those based on polymerized vegetable oil acids, or random, block, or graft interpolymers consisting of two or more of these polyamides, or polyamide blends.

Preferred polyamides are polyepsiloncaprolactam (nylon 6), polyhexamethylene adipamide (nylon 6,6), and a copolymer of polyepsiloncaprolactam and polyhexamethylene adipamide (nylon 6,6/6). The most preferred polyamide is polyepsiloncaprolactam.

Amorphous polyamides such as those prepared with a diacid and meta-or para-xylene diamine, 4,4'-methylenedianiline, 1,3-or 1,4-phenylenediamine, or 2,4- or 2,6-diaminotoluene are also useful.

The aforementioned polyamides containing various terminal functionalities are also suitable for use in the present invention. These include the preferred polyamides which comprise polycaprolactams (nylon 6) which include (a) a carboxylic group attached to one end and an acetamide group attached to the other end of the polymer chain, (b) an amino group attached to both ends of the polymer chain, (c) a carboxyl group attached to one end and an amino group attached to the other end of the polymer chain, and (d) a carboxyl group attached to both ends of the polymer chain. Of these, most preferred are those categorized as (c) above, and include a polycaprolactam having a carboxyl group attached to one end and an amino group attached to the other end of the polymer chain.

In accordance with the present invention's teaching, the second layer further includes a phosphonate ester wherein the phosphonate ester is incorporated in amounts of up to 20% by weight of the polyamide comprising composition used to form the second layer. Suitable phosphonate esters are those which may be characterized as having the chemical structure:

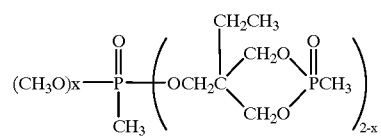

wherein the value of "x" may be 0 or 1. Such a material features excellent thermal stability, low volatility and is readily processable. Preferably, the phosphonate esters according to the invention are a blend of phosphonate esters, as represented above with a preponderance of phosphonate esters wherein the value of "x" is 0, and with a lesser amount of phosphonate esters wherein the value of the substituent "x" is "1". Such a phosphonate ester is commercially available as a viscous, straw-colored liquid and is generally described in the "Product Information Bulletin— 'Antiblaze'® 19 Flame Retardant and 'Antiblaze'® 19T Flame Retardant", copyright 1987, from Albright and Wilson, Inc. of Richmond, Va. These phosphonate esters are discussed as well in U.S. Pat. Nos. 3,789,091 and 3,849,368 assigned to Mobil Oil Corp, the description of which are herein incorporated by reference.

In accordance with the present invention's teaching, the phosphonate ester may be present in any amount to comprise up to about 20% by weight of the composition used to form the second layer, with the sole proviso that an improvement in the fire retardancy of the polyamide containing layer of a structure be realized. It should be apparent to one skilled in the art that the precise amount of phosphonate ester to be incorporated in a composition use to form a structure featuring the benefit of the present invention's teaching is best determined and optimized through experimental methods. Preferably, the weight percentage of the phosphonate ester in the PA comprising composition is within the range to comprise between about 0.001% and 50%, more preferably falls within the range of between about 0.01% and 30%, and most preferably is within the range of between about 0.01% and 25%.

The polyamide layer may optionally include various amounts of additives which are of common usage in the art. Examples of such additives include pigments, dyes, heat stabilizers, lubricants, plasticizers including caprolactam, UV absorbers and stabilizers.

By way of example, representative ultraviolet light absorbers and light stabilizers include various substituted resorcinols, salicylates, benzotriazoles benzophenones, and the like.

Suitable exemplary lubricants and mold release agents include stearic acid, stearyl alcohol, stearamides, sodium stearate and zinc stearate.

By way of example, suitable coloring agents including dyes and pigments include cadmium sulfide, cadmium selenide, titanium dioxide, phthalocyanines, ultramarine blue, carbon black and the like.

Representative oxidative and thermal stabilizers include the Periodic Table of Element's Group I metal halides, such as sodium halides, potassium halides, lithium halides; as well as cuprous halides; and further, chlorides, bromides, iodides. Also, hindered phenols, hydroquinones, aromatic amines as well as substituted members of those above mentioned groups and combinations thereof.

In a manner similar to that discussed above in conjunction with the polyolefin comprising composition, the PA, phosphonate ester and further optional constituents used to form the composition of the second layer of the multi-layer structure may be combined in any manner capable of thoroughly distributing the materials within one another. Methods which are recognized as suitable for use include physical mixing such as the physical mixing attained via the use of a tumbling vessel, and by melt extrusion. Preferably, the constituents are melt extruded wherein measured amounts of the PA, phosphonate ester and any further constituents are physically mixed and subsequently introduced to a single screw extruder, twin-screw extruder, or plastificator, heated to a temperature above the softening point of at least one of the constituents and subsequently extruding the constituents through a die to form strands which are then pelletized. The resulting pellets which consist of the composition which are to be ultimately used to form the second layer may be used as feedstock for the further extrusion operations in accordance with the present invention.

Both layers, i.e. the first layer comprising the flame retardant polyolefin and the second layer comprising the PA and the phosphonate ester may be in the form of a film or sheet obtained by separate extrusion processes, or alternately may be co-extruded. Similarly, if the polyolefin comprising layer and the PA comprising layer are of a different form, the form may be either separately, sequentially or co-extruded. Although dependent upon the particular intended application, typically the polyolefin comprising layer has a thickness of about 0.25 to about 2.30 mm, (about 0.010 to about 0.090 inches), and typically, the PA comprising layer may have a thickness of about 0.05 to about 0.40 mm (about 0.002 to about 0.016 inches). It is to be understood that these thicknesses are for the purpose of illustration, and are not to be considered limiting the applicability of the teachings of the present invention.

The multi-layer structure according to the instant invention can be used in any application where a multi-layer structure is required. In general, the multi-layer structure is useful as an insulation and protective jacket. More specifically, the multi-layer structure in tubular form finds particular use in enrobing an electrical current conductor, i.e. a metal or metallic wire which consists of a single strand or a plurality of strands, and in the alternative in enrobing optical fibers. It is to be understood that the term "enrobing" as used in this specification is to be understood as wrapping, jacketing or encasing the circumference (in the case of wires having a generally circular cross-section) or exterior (in cases of wires which do not have a generally circular cross-section) of a wire or alternately, optical waveguide.

The flame retardancy of the compositions forming the PA comprising layer of the multilayer structures taught herein are evaluated in accordance with the established protocol of the Underwriter's Laboratories UL-94 Tests for the Flammability of Plastic Materials, particularly the "Vertical Burning Test for Classifying Materials 94-V-0, 94-V-1, 94-V-2" which is fully described in the publication "Standard for Safety—Tests for Flammability of Plastic materials for Parts in Devices and Appliances", copyrighted 1973, 1988 and as revised Mar. 19, 1990 at pages 7–10, the complete contents of which are herein incorporated by reference. In brief summary the UL-94 Vertical Burning Test is used to evaluate the performance of bar specimens when contacted with a flame. Sample bars of each specimen are first conditioned in an air circulating oven, and then each of five bars of each of the sample specimens to be evaluated are supported at one end so to extend vertically from the support. A layer of dry absorbent cotton is placed 12 inches below the bar, and then the flame is applied for a ten (10) second interval at the center of the bar. The flame is withdrawn and for the subsequent thirty (30) seconds the bar is visually observed to note the duration of flaming and/or glowing. If it is difficult to distinguish between flaming or glowing, the cotton is brought up into contact with the bar and if ignition occurs, the condition of the bar is considered as flaming. The test is repeated again on the same sample bar for each sample bar to again determine the flammability characteristics thereof. Conditions to be observed and recorded include: (a) duration of flaming after the first flame application, (b) duration of flaming after the second flame application, (c) duration of flaming plus glowing after the second flame application, (d) whether or not specimens are consumed and burn to the holding clamp, and (e) whether or not the specimen drips flaming particles which ignite the cotton swatch.

Specimens evaluated in accordance with the above UL-94 protocol are assigned one of three classes.

Class "94-V-0" is designated for samples which do not burn with a flaming combustion for more than ten (10) seconds after either the first or second application of the test flame, do not have a total flaming combustion time exceeding 50 seconds for the ten 10 flame application for each set of five specimens, are not consumed to the holding fixture, do not have any specimens which drip flaming particles which ignite the dry surgical cotton placed 12 inches below the tested sample, and do not have any specimens with a glowing combustion which persists for more than thirty (30) seconds after the removal of the second flame.

Class "94-V-1" is designated for samples which do not burn with a flaming combustion for more than thirty (30) seconds after either application of the test flame, do not have a total flaming combustion time exceeding 250 seconds for ten (10) flame application for each set of five specimens, are not consumed to the holding fixture, do not have any specimens which drip flaming particles which ignite the dry surgical cotton placed 12 inches below the tested sample, and do not have any specimens with a glowing combustion which persists for more than sixty (60) seconds after the removal of the second flame.

Class "94-V-2" is designated for samples which do not burn with a flaming combustion for more than thirty (30)

seconds after either the first or second application of the test flame, do not have a total flaming combustion time exceeding 250 seconds for the ten 10 flame application for each set of five specimens, are not consumed to the holding fixture, may have one or more specimens which drip flaming particles which ignite the dry surgical cotton placed 12 inches below the tested specimen, and do not have any specimens with a glowing combustion which persists for more than sixty (60) seconds after the removal of the second flame.

Further, if only one specimen of the five sample specimens of a composition does not comply with requirements, a second set of five specimens of the same composition are to be tested. All specimens from this second set must comply with appropriate requirements in order to the material to be properly categorized as 94-V-0, 94-V-1 or 94-V-2.

While not part of the UL Laboratories protocol, the inventor's assign a rating of "HB" indicating a "horizontal burn" for materials which showed flammability of the specimens which exceeded the 94-V-0, 94-V-1 or 94-V-2 ratings.

An alternative test which is useful in determining the flammability characteristics of an enrobed wire is designated as Underwriter's Laboratories's UL 1581 "Horizontal-Specimen Flame Test for Thermoplastic- and Rubber-Insulated Wires and Cables" which is fully described in "Reference Standard for Electrical Wires, Cables and Flexible Cords", (c) Underwriter's Laboratories, pages 100–102, dated Aug. 15, 1983. Briefly, the test requires that sample lengths of a finished, single conductor thermoplastic insulated wire or cable be supported in a horizontal position, and at a point nine inches underneath the sample, a horizontal, flat layer of dry surgical cotton be placed. Subsequently, a gas flame is contacted to the insulated wire's midpoint for a period of 30 seconds, after which the flame is moved away. The duration of the flaming of the insulation layers is noted, as well as the progression of the flaming or other degradation of the wire's insulation. Note is also taken whether any particles or drops are emitted, and whether such ignite the cotton.

A further evaluative procedure is designated as Underwriter's Laboratory's UL 1581 "Vertical Flame Tests" which tests are fully described in "Reference Standard for Electrical Wires, Cables, and Flexible Cords", (c) Underwriter's Laboraboires, pages 95–97, dated Aug. 15, 1983. Briefly, the test requires that a vertical specimen of an insulated conductor shall not flame longer than 60 seconds following five 15 second applications of flame, the period between the applications of the blame being 15 seconds. The insulated conductor shall not ignite combustible materials in its vicinity or damage more than 25 percent of a kraft-paper indicator flag applied to the vertically oriented insulated conductor during, between, or after five applications of flame. The results of the test are either "pass" when satisfying these above requirements, or "fail" when these requirements are not met.

An additional test to determine the flammability of structures was also performed. The Limiting Oxygen Index, (LOI) was determined to establish the minimum concentration of oxygen needed to maintain a candle-like combustion of a sample structure. In this test, a test specimen is placed vertically in a glass cylinder, ignited, and a gas stream of a mixture of oxygen and nitrogen are upwardly directed through the glass cylinder so to pass past vertically oriented wire sample. An initial oxygen concentration is selected, the specimen ignited from the top. Subsequently, the concentration of oxygen in the stream is increased or alternately decreased, and the same specimen is reignited or alternately, a new specimen is provided in like manner to the glass cylinder and ignited. This test is repeated until the lowest concentration of oxygen needed to support a steady, candle-like combustion of a specimen is maintained. The value determined is a numerical value which equals the percentage of oxygen gas in the oxygen/nitrogen gas stream used during the test; higher percentages of oxygen indicate resistance to flammability of a sample, and conversely, lower percentages of oxygen indicate more ready flammability of a test sample.

Evaluation of the physical properties of the compositions forming either of the samples were performed on molded test bars under the following protocols: Notched and Unnotched Izod Impact, ASTM D-256 test, Flexural Properties, ASTM D-790 test, Tensile Strength and Properties, ASTM D-638. The protocols for these properties are well known to those skilled in the art.

Further to these above noted test, elongation of a PA comprising layer in the multilayer structure as taught by the inventors was evaluated as follows: from a two layer structure which had been extruded onto a wire, the PA comprising layer which contains the phosphonate ester was separated from the polyolefin comprising layer. The PA comprising layer was then cut into a ⅛ inch wide strip using a ⅛ inch die cutter, and afterwards the initial elongation was tested in accordance with ASTM 1581 testing protocol to determine initial elongation of the said layer.

Turning now to the drawings, depicted on FIG. 1 is an end perspective view of a multi-layer structure wherein the polyolefin and PA layers are shown to be of a generally planar form. Such a multi-layer structure is meant to represent both small articles, such as plaques and/or plates which are rigid and structurally self supporting, as well as larger articles such as a film or sheet. Further, it is to be understood that such a multi-layer structure being shown may be representative of a film or coating structure suitable to be used in conjunction with a further structure not shown. As depicted, the structure 10 comprises two layers, a first layer 12 comprising a flame retarded polyolefin and a second layer 14 of PA containing composition which includes a phosphonate ester and further optional constituents. Such a structure may optionally include an adhesive materials intermediate the first layer 12 and the second layer 14.

FIG. 2 is an end perspective view of a further structure 20 according to the instant invention and shows a perspective view of a multi-layer structure in accordance with the present invention. The structure 20 comprises a first core-type layer 22 which, in contrast to the structure 10 according to FIG. 1 is seen to be generally non-planar but cylindrical in form. The structure 20 further includes a second layer 24 which comprises a PA layer, and is layered in register with the first layer 22.

FIG. 3 portrays a further embodiment of the present invention, and illustrates an exploded perspective view of an electrical conductor 30 utilizing the multi-layer structure of the present invention. The electrical conductor 30 comprises a wire conductor 32 which may be formed from any suitable metal including copper, aluminum, copper-coated tin, silver-plated copper, and stainless steel. The wire conductor 32 may be of any suitable size, including but not limited to those between 1,000,000 CM ("circular mil") to about 22 AWG ("American Wire Gauge"), although it is contemplated that other wire conductors not within this particular preferred range may also enjoy the benefits of the present invention. Further, the wire conductor 32 may be a single solid metal conductor such as a metal strand or a plurality of metallic conductors which may be twisted metallic conductors.

The first layer 34 (or "inner layer") contacting the electrical conductor 20 is comprises the flame retarded polyolefin and other additives in accordance with the teaching of the instant invention. This first layer may be formed about the electrical conductor 20 by any suitable means. An extrusion process would be preferred. The thickness of the first layer 34 may be any desirable thickness and is not consequential to the practice of the present invention. However, thicknesses which are in common use are preferably employed. The second layer 36 (or "outer layer") comprises the PA and phosphonate ester, as well as optional additives, may be formed about the first layer 32 by any suitable means, with an extrusion process being preferred. Similarly, the thickness of the second layer 36 is not consequent to the enjoyment of the invention, although thickness which are in common use may be employed.

Turning now to FIG. 4, therein is illustrated a schematic representation of an industrial process for producing a multi-layer structure of the invention by coextrusion techniques.

A wire coating line 40 includes an extruder 50 having two barrels 50A and 50B equipped with a co-extruding die 52 capable of extruding the flame retarded polyolefin comprising composition including optional constituents and the PA comprising composition to form a structure onto the wire 41 in accordance with the present invention. Optionally, the wire coating line 40 includes a wire payout reel 42A for supplying wire 41, a wire takeup reel 42B for collecting wire 41 after it has been coated, a series of capstans/pinch rollers 44A, 44B, 44C, 44D which act to guide and/or transport the wire 41, and further equipment, including a wire pretreater 46 located before the extruder 50, a wire posttreater 47, and a marking station 48.

The production process necessary to enjoy the benefits of the present invention are processes which are generally utilized to form multi-layered insulated wires and cables. As such, the features of the processes discussed in conjunction with FIGS. 4 and 5 are to be considered illustrative, and not limiting. Generally, bare wire 41 is played from the wire payout reel 42A where it passes through rollers 44A and to a wire pretreater 46. The wire pretreater 46 is an optional process device within which the bare wire 41 may be conditioned prior to its coating in the extruder 50. Such conditioning may include preheating, chemical/physical cleaning operations, and/or other operations. Subsequently, the wire 41 enters into the crosshead supplied by the two extruders 50 which includes a die 52 capable of extruding the two layers, i.e. the first layer and the second layer onto the wire in accordance with the discussion of the constructions and compositions disclosed above. It is contemplated that the two extruders 50 and the coextrusion die 52 may be any of those presently known to the art, or those yet to be developed which find utility in extruding a plurality of layers of material onto a wire or other structure. One example which is presently known to the art comprises two extruders each having at least one hopper for the containment and feeding of the polyolefin comprising composition and the PA comprising composition which feed their respective constituents to the heated barrel of each of the extruders, which softens the respective compositions and which leads to a suitably formed die 52 which sequentially extrudes the material onto the wire or other structure. Such extruders typically include a rotating screw within each heated barrel (shown on FIG. 4 as 50A and 50B) to effectively mix each of its constituents and to force it into the die 52. The one-stage extrusion process provides benefits which include rapid throughput and overall production rates.

Subsequent to the coextrusion, the exiting wire 41 may optionally be subjected to a wire posttreater 47 which is a conditioner or conditioning step subsequent to the application of the insulation structure onto the wire 41. The posttreater 47 may be any conditioning step or operation, and might comprise a cooling operation, a further heating process to drive off any organic materials and/or effect curing of one or both of the layers extruded onto the wire 41, a quenching operation such as a water bath, or other beneficial conditioning process. Subsequently, the wire 41 passes through further capstans/pinch rollers 44B and may be passed to an imprinting station 48 wherein the exterior of the insulated wire 41 is marked with identifying information in a manner well known to the art. Subsequently, the wire 41 passes through further capstans/rollers 44C, 44D and is taken up by the wire takeup reel 42B. Thence, the insulated wire 41 may be removed from the wire coating line 40 and utilized.

FIG. 5 is a further schematic representation of a process for producing a multi-layer structure of the invention by a "tandem" extrusion process. This wire extrusion line 54 substantively differs from that portrayed in FIG. 4 only by the substitution of the single crosshead die 52 as shown on FIG. 4 with two extruders 60, 64 each with its own die, 62, 66; consequently, similarly designated elements within FIG. 4 and FIG. 5 are considered interchangeable and commentary concerning their operation as discussed for FIG. 4 is deemed equivalent and incorporated herein by reference. In this embodiment of the invention as shown on FIG. 5, the wire 41 entering a suitable die 62 which is fed by the extruder 60 and is coated with a first layer as discussed above. The wire 41 thus provided with the first layer is subsequently coated within a second die 66 which is fed by extruder 64 with the polyamide layer to form a structure in accordance with the teachings of the present invention.

In the foregoing discussion of FIG. 4 and FIG. 5, the use of multi-layer structures of the present invention have been discussed and described in conjunction with the formation of an insulation structure for a wire conductor or wire cable. However, the utility of the invention in other applications which might find benefit is not to be discounted; usage with other strand type materials, including fibers, optical fibers and the like are expressly contemplated. Further, the relative terms "inner" and "outer" have been used in describing the relative position of the polyolefin comprising and the PA comprising layers; such a convention has been adopted as a matter of convenience and not as a matter of necessity. Constructions where the PA layer forms the "inner" layer and the polyolefin comprising layer forms the "outer" layer are contemplated.

In the following embodiments of the invention, it is to be understood that in the description of any composition, all percentages associated with a constituent used to form a composition are to be understood as to be "percentage by weight" of the particular constituent relative to the composition of which it forms a part. Exceptions to this convention will be particularly noted.

EXAMPLES

In the following embodiments of the invention, it is to be understood that in the description of any composition, all percentages associated with a constituent used to form a composition are to be understood as to be "percentage by weight" of the particular constituent relative to the composition of which it forms a part. Exceptions to this convention will be particularly noted.

Examples 1–7

For the production of Examples 1–4, various compositions comprising Capron® 8224. HS, a heat stabilized nylon homopolymer containing resin described as having a specific gravity according to ASTM D-792 of 1.13, and melting point of about 420° F. [215° C.], and functionally characterized as a medium viscosity, heat stabilized extrusion grade resin suitable for extrusion for THHN, THWN, shipboard cable, building wire, and non-metallic sheathed cable primary having the following physical characteristics: ultimate elongation, about 200% , flex strength according to ASTM D-790 of about 11,700 psi [80 MPa], a flexural modulus according to ASTM D-790 of about 377,000 psi [2,210 MPa], a notched Izod impact strength per ASTM D-256 of about 1.0 ft-lbs./inch [55 J/m] in the form of pellets, and a phosphonate ester comprising material, Antiblaze® 1045 commercially available from Albright and Wilson in the form of a viscous liquid were provided to the feed of a single screw extruder operating under the following conditions: temperature profile; zone 1, set temperature, 266° C., zone 2, set temperature, 261° C., zone 3, set temperature, 255° C., zone 4, set temperature 250° C., zone 5, set temperature 240° C., zone 6, set temperature 240° C., zone 7, set temperature 240° C. The screw was operated to rotate at 100 RPM, and the pressure at the breaker plate was registered at 700 psi [328 kPa]. The extrudate was formed into strands which were subsequently pelletized. The pellets were used for the subsequent formulation and production of test samples.

For the production of Examples 5–7, various compositions compositions comprising Capron® 8202 HS, a low viscosity molding grade heat stabilized nylon homopolymer containing resin described as having a specific gravity according to ASTM D-792 of 1.13, and melting point of about 420° F. [215° C.], suitable for extrusion for THHN, THWN, shipboard cable, building wire, and non-metallic sheathed cable primary having the following physical characteristics: ultimate elongation according to ASTM-D638, about 70% ; flex strength according to ASTM-D790, about 15,400 psi [110 MPa]; flexural modulus according to ASTM-D790, about 377,000 psi [2825 MPa]; notched Izod impact strength according to ASTM-D256 of about 1.0 ft-lbs./inch [55 J/m] and further including a phosphonate ester comprising material, Antiblaze® 1045 commercially available from Albright and Wilson in the form of a viscous liquid were provided to the feed of a single screw extruder operating under the following conditions: temperature profile; zone 1, set temperature, 266° C., zone 2, set temperature, 261° C., zone 3, set temperature, 255° C., zone 4, set temperature 250° C., zone 5, set temperature 240° C., zone 6, set temperature 240° C., zone 7, set temperature 240° C. The screw was operated to rotate at 100 RPM, and the pressure at the breaker plate was registered at 700 psi [328 kPa]. The extrudate was formed into strands which were subsequently pelletized. The pellets were used for the subsequent formulation and production of test samples.

In accordance with the percentages shown on Table 1 below, various experimental compositions with varying weight proportions of the Capron® 8202 HS resin or Capron® 8224 HS resin and the phosphonate ester which resulted in differing compositions were formulated and formed into standard test bars of dimensions 6 inches by ½ inch by 1/32 inches [1.27 cm by 0.08 cm] in an Arburg injection molding machine and were subjected for further evaluation, which are noted on Table 2 which reports the physical test results of the said test specimens.

TABLE 1

Example Compositions

|  | Ex. 1 | Ex. 2 | Ex. 3 | Ex. 4 | Ex. 5 | Ex. 6 | Ex. 7 |
|---|---|---|---|---|---|---|---|
| Capron 8224 HS: | 85 | 100 | 88.75 | 94 | — | — | — |
| Capron 8202 HS | — | — | — | — | 90 | 85 | 80 |
| Antiblaze 1045 | 15 | — | 11.25 | 6 | 10 | 15 | 20 |

TABLE 2

Physical Properties

|  | Ex. 1 | Ex. 2 | Ex. 3 | Ex. 4 | Ex. 5 | Ex. 6 | Ex. 7 |
|---|---|---|---|---|---|---|---|
| Flexural Str, psi (1000's): | 7.19 | 15.46 | 8.35 | 11.76 | 14.02 | 12.39 | 8.53 |

TABLE 2-continued

Physical Properties

|  | Ex. 1 | Ex. 2 | Ex. 3 | Ex. 4 | Ex. 5 | Ex. 6 | Ex. 7 |
|---|---|---|---|---|---|---|---|
| Flexural Modulus, psi (1000's): | 166 | 377 | 200 | 296 | 355 | 321 | 201 |
| Tensile Yield Str., psi (1000's): | 5.12 | 12.09 | 7.79 | 9.55 | 7.81 | 6.51 | 5.23 |
| Yield Elongation, %: | 4 | 5 | 5 | 5 | — | — | — |
| Ultimate Tensile Strength, psi (1000's): | 4.49 | 7.46 | 5.78 | 6.78 | — | — | — |
| Ultimate Elongation, %: | 49 | 198 | 151 | 185 | 244 | 197 | 143 |
| Notched Izod, ft-lb./in: | 0.65 | — | 0.7 | 0.79 | — | — | — |
| Unnotched Izod, ft-lb./in: | 4.8 | — | 11.6 | 18 | — | — | — |

Table 3 reports the findings from the UL-94 flame test on five standard test bars of various Example compositions.

TABLE 3

Flammability
UL-94 Testing Protocol

| Composition: | Sample No.: | First Burn, (sec): | Drip?: | Ignite Cotton?: | Second Burn, (sec): | Drip?: | Ignite Cotton?: | Glow, (sec): |
|---|---|---|---|---|---|---|---|---|
| Ex. 1 | 1 | 0 | Yes | No | 0 | Yes | No | 0 |
|  | 2 | 0 | Yes | No | 0 | Yes | No | 0 |
|  | 3 | 0 | Yes | No | 0 | Yes | No | 0 |
|  | 4 | 0 | Yes | No | 0 | Yes | No | 0 |
|  | 5 | 0 | Yes | No | 0 | Yes | No | 0 |
| Ex. 2 | 1 | 2 | Yes | Yes | 80 | Yes | — | — |
| Ex. 3 | 1 | 1 | Yes | Yes | 0 | Yes | No | 0 |
|  | 2 | 0 | Yes | No | 0 | Yes | No | 0 |
|  | 3 | 0 | Yes | Yes | 0 | Yes | No | 0 |
|  | 4 | 0 | Yes | Yes | 0 | Yes | No | 0 |
|  | 5 | 0 | Yes | Yes | 0 | Yes | No | 0 |
| Ex. 4 | 1 | 0 | Yes | No | 0 | Yes | No | 0 |
|  | 2 | 0 | Yes | No | 0 | Yes | No | 0 |
|  | 3 | 0 | Yes | Yes | 0 | Yes | No | 0 |
|  | 4 | 0 | Yes | No | 0 | Yes | No | 0 |
|  | 5 | 0 | Yes | No | 0 | Yes | No | 0 |
| Ex. 7 | 1 | 0 | Yes | No | 0 | Yes | No | 0 |
|  | 2 | 0 | Yes | No | 0 | Yes | No | 0 |
|  | 3 | 1 | Yes | No | 0 | Yes | No | 0 |
|  | 4 | 0 | Yes | No | 0 | Yes | No | 0 |
|  | 5 | 0 | Yes | No | 0 | Yes | No | 0 |

Table 4 reports the findings from tests to determine the Limiting Oxygen Index, wherein samples were tested in accordance with the protocol outlined above.

TABLE 4

| Composition: | Ex. 1 | Ex. 2 | Ex. 3 | Ex. 4 |
|---|---|---|---|---|
| Limiting Oxygen Index: | 28 | 21 | 26 | 22 |

As may be seen by inspection, the composition of Ex. 2 is a control sample and does not contain phosphonate ester as is taught by the present invention, but is provided for comparative purposes.

With reference to the properties reported on Table 2, it may be readily observed that with respect to the flexural properties of Examples 1,3 and 4 in comparison with that of Example 2, the Ultimate Tensile Strength and particularly the Ultimate Elongation of the samples may be favorably compared particularly the Ultimate Elongation of Ex. 3 and Ex. 4, whose respective values of 151% and 185% compare favorably to the Ultimate Elongation of the comparative Example 2 with its reported value of 198%. It is further to be seen that the Ultimate Elongation of the samples according to Examples 5, 6 and 7 also compary very favorably with the Ultimate Elongation of the comparative Example. More striking, the results of the Flexural Modulus of Examples 5–7 are comparable to the results of the comparative Example 2.

Turning now to the reported results of Tables 3 and 4, the improvement is even more striking. Whereas the composition of Example 2 is shown on Table 3 to fail the UL-94 Testing Protocol and be assigned an "HB" Rating as denoted above, the results of Examples 1, 3, 4 and 7 are respectively assigned a 94-V-0", "94-V-2", "94-V-2" and "94-V-0" ratings with respect to their fire retardancy in accordance with the grading protocol of the UL-94 Test briefly discussed above. Thus, it may be seen that the polyamide composition comprising the phosphonate ester in the percentages taught to be preferred feature good to excellent fire retardant characteristics and simultaneously providing good retention of elongation characteristics.

Examples 8–10

Plural multi-layered structures were extruded onto a solid copper electrical conductor utilizing a fire retardant polyolefin composition, and the compositions according to Examples 5–7 in accordance with the following general procedure.

A fire retardant polyolefin resin was supplied to a first single-screw extruder and a composition according to Example 5, 6 or 7 was provided to the feed hopper of the second single-screw extruder. Both extruders fed to a cross-head type die, and were operated to coextrude the fire retardant polyolefin onto the copper electrical conductor, and afterwards, the composition according to one of Examples 5–7 thereon in a conventional manner. The feedrate of the copper conductor was 1000 feet/minute; the operating conditions of the second extruder was: zone 1, at 469°; zone 2, at 478°; zone 3, at 481° F.; zone 4, 487° F.; zone 5, 491° F.; the flange was at 492° F., and the cross-head die was at 485° F. The extruder screw operated at 15 rpm, the motor drawing a current of 16 amps, and the head pressure was 1200 psi.

The electical conductors comprising the multilayer structures as taught herein were subsequently tested in accordance wth the Underwriter's Laboratory's UL1581 "Vertical Flame Tests" described above. All of the insulated conductors resulted in "pass" ratings.

As a review of the results of the various test will reveal, the present invention provides an improved structure which exhibits excellent fire-retardant behavior, particularly as evidenced in the UL1581 Vertical Flame Test, while simultaneously preserving good flexibility and other physical properties.

It will be appreciated that the instant specifications and examples set forth herein are by way of illustration and not limitation, and that various modifications and changes may be made without departing from the spirit and scope of the present invention, whose limitations are bounded only by the appendant claims.

We claim:

1. A multi-layer structure comprising:

a first layer comprising a composition comprising a fire retardant polyolefin, and, a second layer comprising a composition comprising a polyamide and a phosphonate ester of the formula:

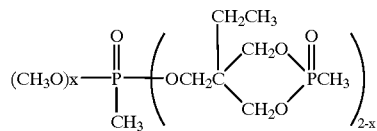

2. The structure according to claim 1 wherein the phosphonate ester comprises more than zero percent and up to 50 percent by weight of the composition of the second layer of the structure.

3. The structure according to claim 2 wherein the phosphonate ester comprises more than 0.001% and less than 35% by weight of the composition of the second layer of the structure.

4. The structure according to claim 3 wherein of the phosphonate ester comprises more than 0.01% and less than 25% by weight of the composition of the second layer of the structure.

5. The structure according to claim 1, wherein the second layer comprises two phosphonate esters of the formula:

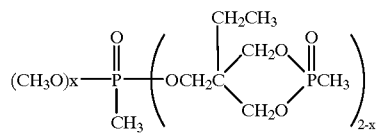

6. The structure according to claim 5 wherein the amount of the phosphonate ester represented by the structure having the value of "x" equal to 0 exceeds the amount of phosphonate ester represented by the structure having the value of "x" equal to 1.

7. An electrical cable enrobed with the structure according to claim 1.

8. A film formed from the structure according to claim 1.

9. A multi-layer structure according to claim 1, wherein the polyamide is selected from the group consisting of:

(a) polyamides prepared by the polymerization of lactams;

(b) polyamides prepared by the condensation of a diamine with a dibasic acid;

(c) polyamides prepared by self condensation of amino acids;

(d) polyamides prepared by self condensation of vegetable oil acids;

(e) graft polymers consisting of one or more of (a)–(d);

(f) blends of one or more of (a)–(d).

10. A multi-layer structure according to claim 1, wherein the polyamide is polyepsiloncaprolactam.

11. A multi-layer structure according to claim 1, wherein the second layer has an ultimate elongation of at least 50%.

12. A multi-layer structure according to claim 1, wherein the second layer has an ultimate elongation of at least 100%.

13. The structure according to claim 9 wherein the polyamide is selected from the group consisting of: polyepsilon-caprolactam (nylon 6), polyhexamethylene adipamide (nylon 6,6), and copolymers of polyepsiloncaprolactam and polyhexamethylene adipamide (nylon 6,6/6).

14. The structure according to claim 9 wherein the polyamide has a terminal functional group selected from the group consisting of hydroxyl, carboxyl, carboxylic, amide, acetamide, and amine.
15. A multi-layer structure consisting essentially of:
a first layer comprising a composition comprising a fire retardant polyolefin, and,
a second layer comprising a composition comprising a polyamide and a phosphonate ester of the formula:
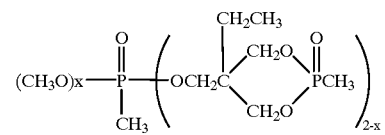
wherein x is 0 or 1.
* * * * *